United States Patent
Firdaus

[19]
[11] Patent Number: 6,022,285
[45] Date of Patent: *Feb. 8, 2000

[54] WHEEL DRIVE SYSTEM

[75] Inventor: Usman Firdaus, Strongsville, Ohio

[73] Assignee: MTD Products, Inc, Cleveland, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/682,274

[22] Filed: Jul. 17, 1996

[51] Int. Cl.[7] .............................. F16H 7/00; F16H 7/24; B62K 5/02
[52] U.S. Cl. ............................ 474/86; 474/150; 180/217
[58] Field of Search .................................. 474/84.86, 148, 474/149, 150, 273; 123/195 R, 195 A, 195 H; 74/572, 573 R; 180/210, 211, 215, 217

[56] References Cited

U.S. PATENT DOCUMENTS

| | | | |
|---|---|---|---|
| 2,736,489 | 2/1956 | Bopf | 474/150 X |
| 4,452,193 | 6/1984 | Morris | 123/195 |
| 4,702,728 | 10/1987 | Williams | 474/148 |
| 5,113,964 | 5/1992 | Yamauchi | 474/84 X |
| 5,322,481 | 6/1994 | Wang | 474/148 |
| 5,577,972 | 11/1996 | Herr | 474/150 |

FOREIGN PATENT DOCUMENTS 0093354  4/1983  European Pat. Off. ....... A01D 69/00

*Primary Examiner*—Tamara L. Graysay
*Assistant Examiner*—Matthew A. Kaness
*Attorney, Agent, or Firm*—Emerson & Associates; Roger P. Emerson; Timothy D. Bennett

[57] ABSTRACT

A wheel drive system using an enlarged flywheel shaft to form an integral drive pulley for a wheel drive.

8 Claims, 4 Drawing Sheets

WHEEL DRIVE SYSTEM

FIELD OF THE INVENTION

This invention relates to an improved wheel drive for small lawn and garden equipment such as lawn vacuums, blowers, snow blowers and the like.

BACKGROUND OF THE INVENTION

Small lawn and garden equipment typically has some sort of drive system in order to propel such device across the lawn. Typically these drives are taken off of a separate reduced speed power take off driven by the reduced speed cam shaft of the engine or from a separate pulley system mounted on the engine shaft. While these drives are functional, that is they do provide the power necessary to power the device across the lawn, they either significantly add to the cost of an associated part (for example, a separate cam shaft driven PTO on an engine) or they have certain other complications in respect thereto (a separate pulley system needs the separate system and in addition needs a significant reduction ratio in order to make the in drive suitable for powering the relatively low speed wheels).

OBJECTS AND SUMMARY OF THE INVENTION

It is an object of this present invention to provide for a low cost wheel drive system.

It is another object of the present invention is to simplify th e instruction and operation of wheel drive systems.

It is yet another object of the present invention to provide for a simple and effective selectable wheel drive.

It is still another object of the present invention to reduce the inventory needed for construction and/or repair of lawn and garden devices.

It is yet a further object of this invention to increase the longevity of lawn and garden equipment including wheel drives.

It is still a further object of this invention to reduce the weight of lawn and garden devices including wheel drives.

Other objects and a more complete understanding of the invention may be had by referring to the drawings.

BRIEF DESCRIPTION OF THE DRAWINGS

The structure, operation, and advantages of the presently disclosed preferred embodiment of the invention will become apparent when consideration of the following description is taken in conjunction with accompanying drawings wherein.

DETAILED DESCRIPTION OF THE INVENTION

Figure 1:
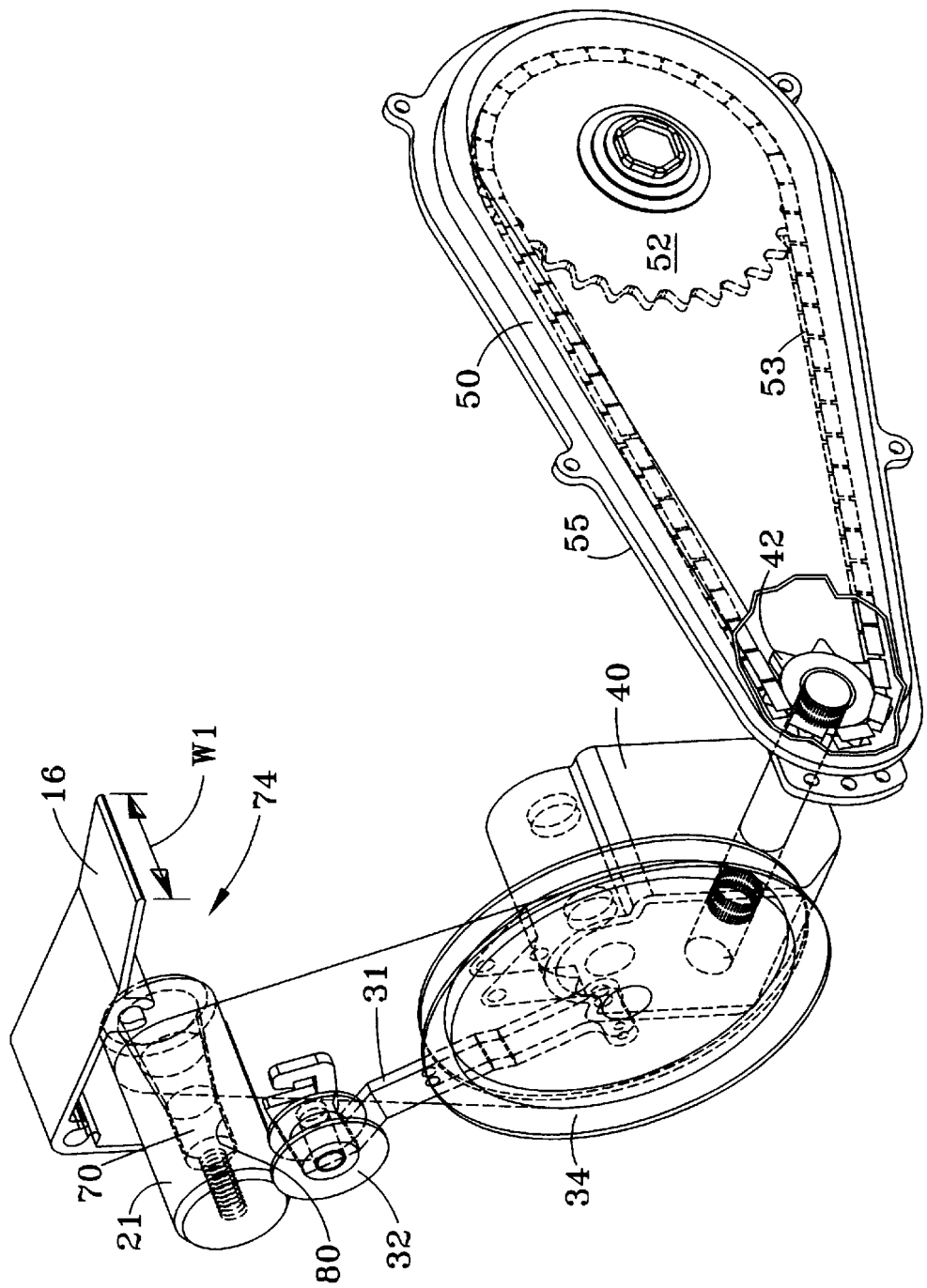
FIG. 1 is a perspective view of a wheel drive built in accord with the invention of the application.

The wheel drive of this invention is designed to operate with a piece of lawn and garden equipment such as a lawn blower/vacuum, snow blower, lawn mower or other such familiar device. These devices compete in a competitive market wherein cost and ease of use frequently compete. This adds to the incentive for a lost effective, adaptive reliable wheel drive.

The invention will be described in a representational preferred embodiment in a lawn blower/vacuum having a flywheel stabilized power mechanism (FIG. 4) This lawn blower/vacuum includes a frame 10, an engine 11, a fan assembly 12, a flywheel 13, a collection bag 15, wheels 17, and the subject wheel drive 20.

The frame 10 is designed to interconnect the various operative pieces of the device so as to integrate the same. The particular frame 10 disclosed includes an engine mount section and forwardly extending stabilizer arms.

The engine 11 is designed to provide the operative power for the device. The particular engine 11 disclosed is a horizontal shaft engine mounted on the rear section of the frame 10, the engine mount section, with the engine shaft 70 extending directly forward in the direction of travel. To distinguish the engine shaft 70 from a later to be described central rotary shaft 21, the engine shaft 70 is hereby also identified as a first shaft 70. The operative speed control for the engine 11 preferably is mount on the handlebars of the device within easy reach of the operator by a remote lever and boden wire in a known fashion.

The stabilizer arms allow the height of the air input/output assembly to be adjusted while at the same time allowing the weight of the device to be lower than otherwise due to the fact that the fan assembly flywheel later described can extend down beneath the main body of the frame 10.

Figure 4:
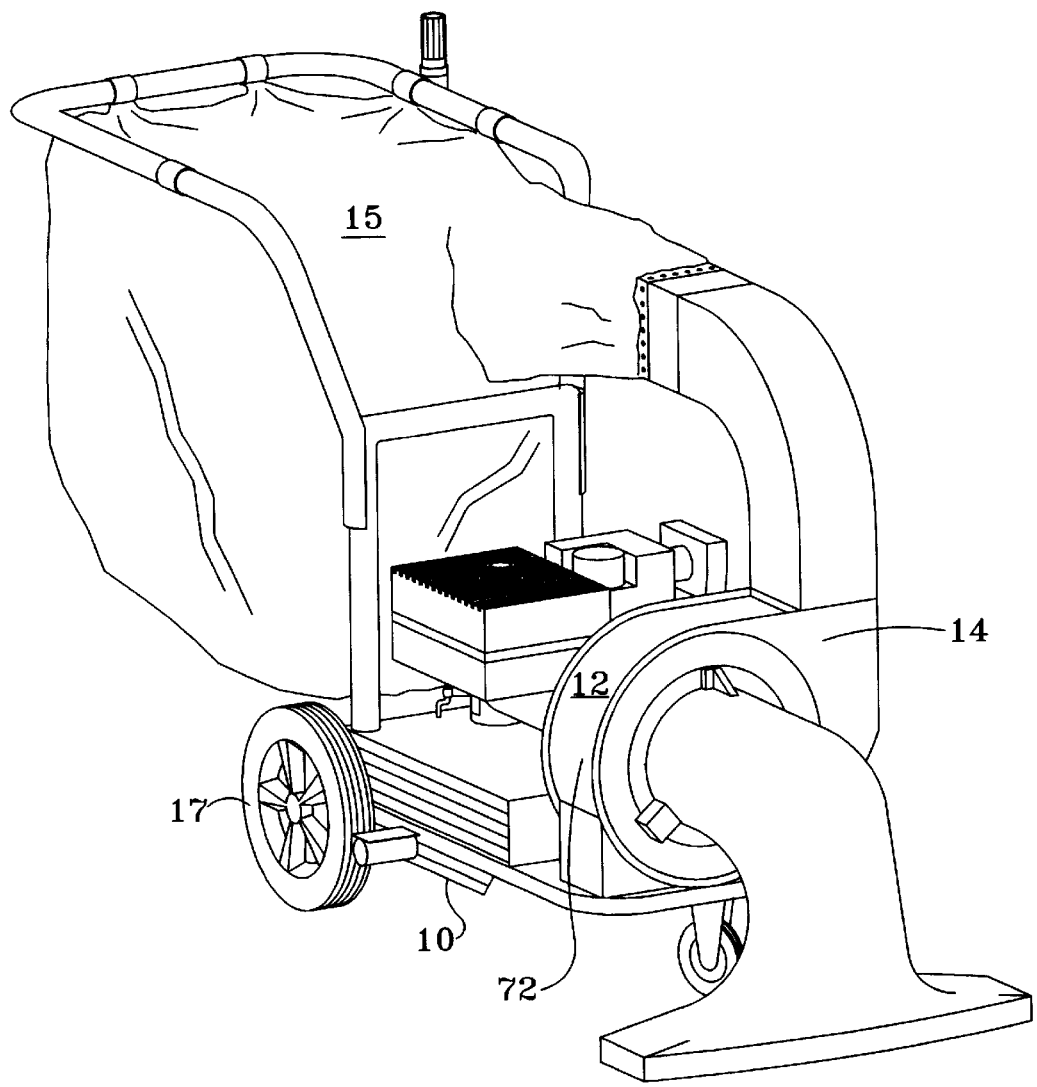

The fan assembly 12 is the main functioning element of the disclosed device. The particular fan assembly 12 disclosed is directly mounted to the frame 10 of the device immediately forward of the engine 11. The fan assembly 12 includes a housing 72 as shown in FIG. 4. This fan assembly 12 car have its outlet 14 directed to the collection bag 15 to serve as a lawn vacuum (as shown in FIG. 4). Alternately the outlet 14 may be rotated by substantially 90° clockwise so as to serve as a lawn blower.

A flywheel 13 (shown in representational form in FIG. 2) is located integrally with the fan assembly 12 that is, the flywheel 13 is located within the housing 72 of the fan assembly 12. This flywheel 13 smooths out any power fluctuations as well as providing a reserve of energy to enable the device to handle momentary unusual loads.

In the particular embodiment disclosed the flywheel 13 is directly mounted to a central rotary shaft 21 for common rotation therewith. To distinguish the central rotary shaft 21 from the previously described engine shaft 70 (also identified as the first shaft 70), the central rotary shaft 21 is hereby also identified as a second shaft 21. This is preferred in this particular embodiment in that it provides for a very efficient transfer of power between the engine 11 and the fan assembly without the necessity of a full horsepower high speed high torque clutch system. In alternate embodiments a clutch, reduction drive or other intermediate power modification system might be located between the engine and driven implement.

The outlet 14 of the particular lawn vacuum can be selectively rotated between an upwardly extending position wherein the debris is discharged into the accompanying bag 15 (vacuum position as shown in FIG. 4) and a secondary position wherein the outlet is directly substantially parallel to the ground slightly spaced therefrom so as to provide for a blower function for the device.

Figure 2:
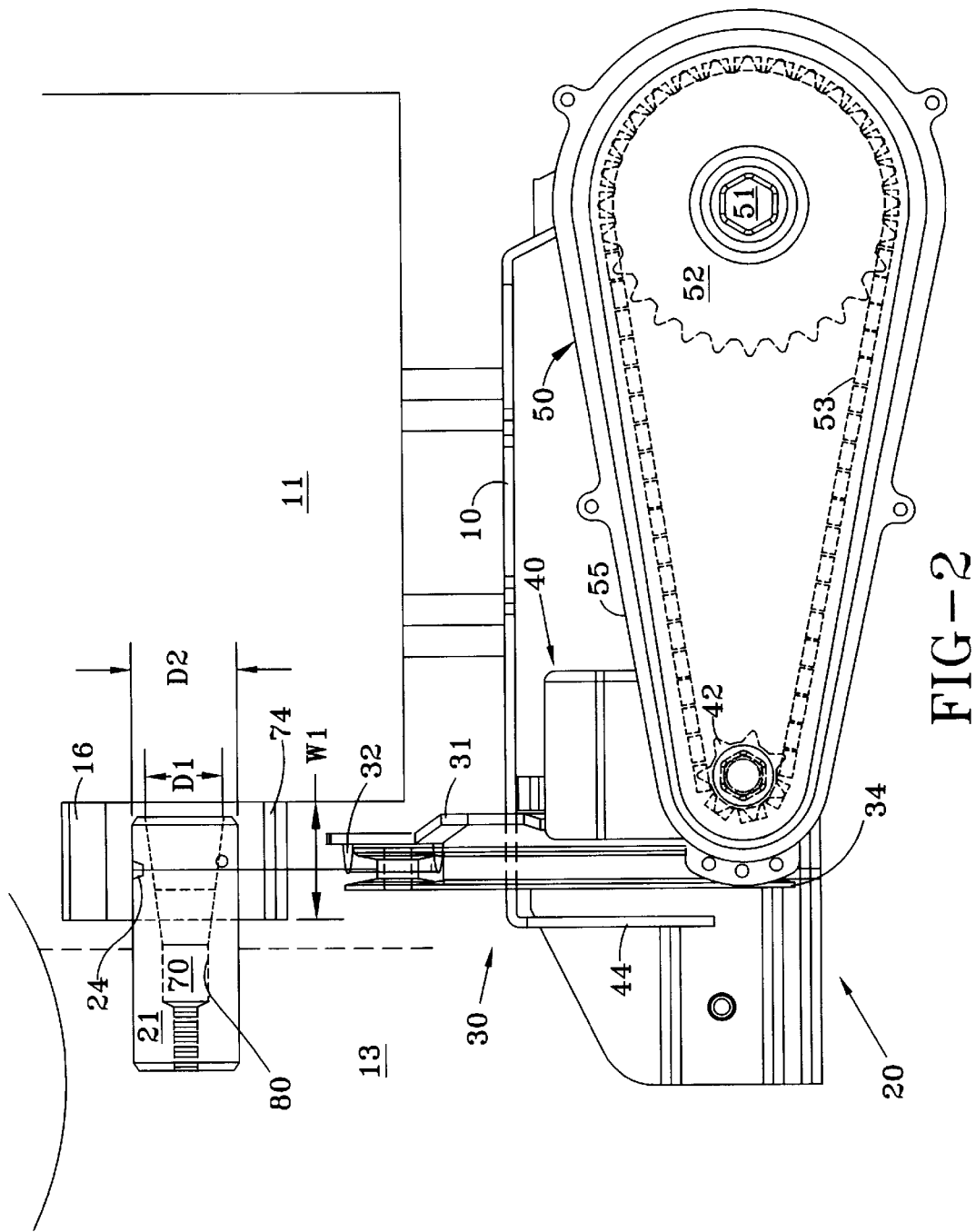
FIG. 2 is a side view of a wheel drive of FIG. 1.

A spacer 16 separates the fan assembly 12 from the engine 11 disclosed. The spacer 16 has width W1 as shown in FIGS. 1 and 2 and therefore provides a space 74 also having the width W1 between the fan assembly 12 and the engine 11. This spacer 16 allows the fan assembly 12 to be solidly interconnected to the engine 11 even if the wheel drive system of this application is. not included (i.e. no need to duplicate parts/inventory between varying levels of device).

In addition, the spacer allows access to the drive shaft in order to provide power for the later described wheel drive 20.

The wheel drive 20 interconnects a groove on the engine shaft to the wheel drive. The preferred wheel drive 20 includes a groove 24, an idler pulley mechanism 30 able to selectively engage a belt drive, a single speed right angle transmission 40, and a chain reduction drive 50.

Figure 3:
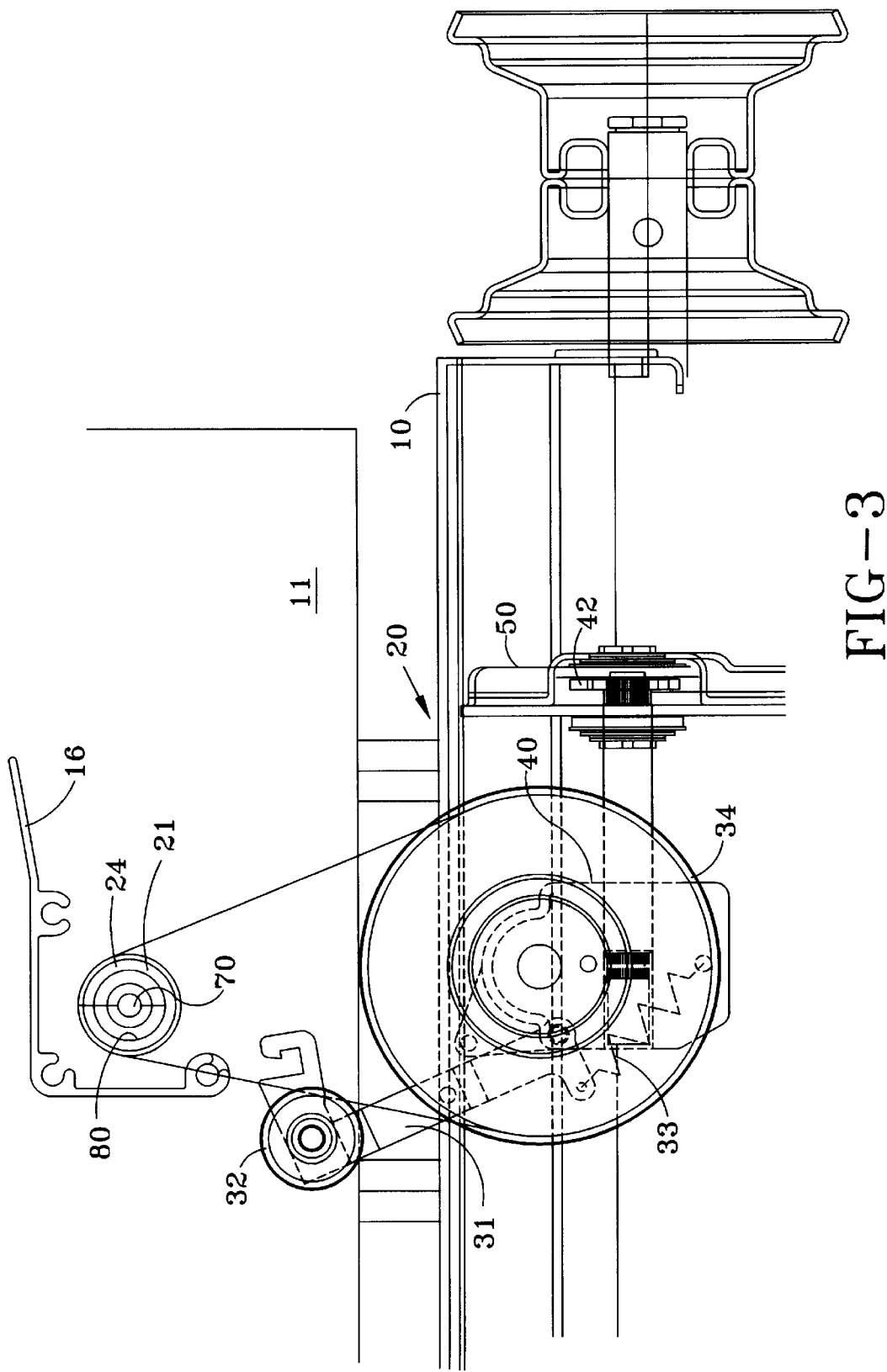
FIG. 3 is a cut away cross section end view through the main operative components of a wheel drive of FIG. 1; and, FIG. 4 is a perspective view of a lawn blower/vacuum incorporating the invention of the application.

The groove 24 is designed to interconnect the wheel drive system 20 to the engine shaft 70. It should be noted, as shown in FIG. 2, that the groove 24 is located with the space 74. The particular groove disclosed is a groove integral with a central rotary shaft 21 of the fan mechanism. As shown in FIG. 2, the engine shaft 70 has a diameter D1 and the central rotary shaft 21 has a diameter D2 where the diameter D2 of the central rotary shaft 21 is greater than the diameter D1 of the engine shaft 70. This allows the central rotary shaft 2: to perform two functions: a) The interconnection of the fly wheel 13 to the engine 11 and (b) also to the wheel drive 20. As shown in FIGS. 1–3, the second shaft 21 has a shaft receiving bore 80 for operatively receiving the first shaft 70.

In order to reduce the manufacturing, repair and other inventory, it is preferred that this central rotary shaft 21 be universal for use with all fan mechanisms, whether or not they are associated with any wheel drive 20. This avoids duplicate inventories as well as allowing for a commonality of parts across model lines. Preferably the spacer 16 is universal also for similar reasons.

The particular groove 241 disclosed is designed for use with a half inch V belt. The groove 24 on the central rotary shaft 21 also has the diameter of approximately 2 inches.

The idler pulley mechanist 30 is designed to selectively engage the wheel drive 20. The particular idler pulley mechanism disclosed includes a selectively moveable idler arm 31, an idler pulley 32, and a second output pulley 34.

The arm 31 is interconnected by a boden wire to a dead-man type control onto the handlebars such that manipulation of the control moves the arm 31 from disengaged to engaged positions. The pulley 32 is itself is bias by a spring 33 into a neutral position, directly or indirectly.

The pulley 32 at the end of the arm 31 interengages the outer surface of the belt 25 in order to cause a drive condition between the groove 24 in the central rotary shaft 21 and the second pulley 34. In the preferred embodiment disclosed, the second pulley 34 has an outer diameter of approximately 4 ½ inches. This provides for a 2 ½ to 1 reduction ratio in this idler pulley clutch drive mechanism 30 from groove 24 to second pulley 34.

The second pulley 34 is fixedly mounted to the input of the single speed right angle transmission 40. This single speed right angle transmission 40 provides for a further reduction of the wheel drive 20 as well as providing for a right angle transformation of the power drive.

The transmission has a further reduction ratio of approximately 3 ½ to 1. In respect to the right angle drive, the transmission 40 takes a drive from the second pulley 34 substantially parallel to the central rotary shaft 21 and transforms it into a drive of a sprocket 42 substantially parallel to the axle 51 of the device. This allows for a forward facing engine to power sideward facing wheels (other systems such as a double idler belt system could accomplish a similar result).

The chain reduction drive 50 takes the output of the transmission 40 and interconnects it to the axle 51 of the device so as to complete the wheel drive 20 thereto.

The particular reduction drive 50 disclosed is a chain reduction drive including a chain housing 55, the drive sprocket 42 on the transmission 40, and an output driven chain sprocket 52 on the axle of the device. A chain 53 drivingly interconnects the drive sprocket 42 to the driven chain sprocket 52.

In order to avoid contamination of the drive 50, such drive is located inside a sealed chain housing 55. This prevents contaminants from entering this the final reduction drive. Note that it is preferred that the driven chain sprocket 52 floats on the axle 51 so as to allow for a certain degree of tolerance between the alignment of the driven chain sprocket 52 and the output drive sprocket 42 of the single speed transmission—a transmission itself solidly mounted to the frame 10 by an interconnection plate 44.

In the particular chain reduction drive 50 disclosed has approximately 5 to 1 reduction ratio.

With the aggregate reduction ratios the groove 24 is capable to be mounted directly onto the engine shaft, a shaft which can rotate as high as 3600 RPM, while still providing for the proper axle speed 51 for the entire device. Further, the use of the central rotary shaft 21 as a pulley, in addition to simplifying the construction for the device, eliminates necessity for a separate reduction shaft at the engine (typically taken off the cam shaft). This significantly reduces the cost of the engine.

Although the invention has been described in its preferred form but the certain degree of particularity, it is to be understood that numerous changes can be made without deviating the invention as hereinafter claimed.

What is claimed:

1. A lawn care device comprising:

a frame;

a first wheel rotatably connected to said frame;

an engine that is operatively mounted to said frame;

a first shaft selectively rotated by said engine;

a wheel drive mechanism for selectively driving said first wheel, said wheel drive mechanism including,
   A) a second shaft having a shaft receiving bore, said first shaft being operatively received within said shaft receiving bore of said second shaft;
   B) a first pulley formed integrally with said second shaft, said first shaft, said second shaft and said first pulley being axially aligned; and,
   C) interconnecting means for selectively drivingly interconnecting said first pulley to said first wheel.

2. The lawn care device of claim 1 wherein the device has a flywheel directly mounted to said second shaft.

3. The lawn care device of claim 2 wherein said flywheel is driven by said first shaft.

4. The lawn care device of claim 3 further comprising a spacer and wherein said flywheel is mounted within a housing and is spaced from said engine by a space defined by said spacer and said pulley being located in said space.

5. The lawn care device of claim 4 wherein said pulley is integral with said second shaft.

6. The lawn care device of claim 4 wherein said spacer is located between said housing and said engine.

7. The lawn care device of claim 2 wherein said flywheel is contained within a housing, said pulley being located outside said housing.

8. The lawn care device of claim 7 wherein said flywheel is driven by said first shaft and said second shaft is mounted directly to said first shaft axially aligned therewith.

* * * * *